United States Patent
Hilts et al.

(10) Patent No.: US 7,095,425 B2
(45) Date of Patent: Aug. 22, 2006

(54) SUPERPOSED COLORS GRAPHIC FOR PROVIDING A CONTINUOUS COLOR FADE TRANSITION BETWEEN TWO COLORS

(75) Inventors: Christopher S. Hilts, Dearborn, MI (US); James Thomas Embach, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 462 days.

(21) Appl. No.: 10/646,212

(22) Filed: Aug. 22, 2003

(65) Prior Publication Data

US 2005/0041033 A1    Feb. 24, 2005

(51) Int. Cl.
*G09G 5/00*    (2006.01)
(52) U.S. Cl. ............... 345/640; 345/589; 358/521; 340/815.65
(58) Field of Classification Search .............. 40/444, 40/581; 116/247, 335; 165/11.1; 236/94; 340/815.43, 815.56, 815.65, 955; 345/589, 345/640; 358/521; 362/351; 968/391; D10/102
See application file for complete search history.

(56) References Cited

U.S. PATENT DOCUMENTS 5,353,391 A * 10/1994 Cohen et al. ............... 345/619
6,078,312 A *  6/2000 Liebenow ................... 345/166

* cited by examiner

*Primary Examiner*—Matthew C. Bella
*Assistant Examiner*—G. F. Cunningham
(74) *Attorney, Agent, or Firm*—Laura C. Hargitt (57) ABSTRACT

A superposed colors graphic providing a true, continuous color fade transition between two different colors achieved by applying first and second color graphics onto respectively different side surfaces of at least one transparent substrate, each color graphic having a respective color fade. The first and second color graphics are mutually aligned such that the color fade of each of the color graphics are mutually coextensive and superposed so as to thereby provide a continuous fade between the colors. The first and second color graphics may be applied to the respective substrate side surfaces by any suitable method, such as for example by silk screening, by lithography or by decorative film applique.

20 Claims, 6 Drawing Sheets
(1 of 6 Drawing Sheet(s) Filed in Color)

SUPERPOSED COLORS GRAPHIC FOR PROVIDING A CONTINUOUS COLOR FADE TRANSITION BETWEEN TWO COLORS

TECHNICAL FIELD

The present invention relates to a graphic wherein two different colors are visually perceived as continuously fading from one color into the other color, and vice versa.

BACKGROUND OF THE INVENTION

Colors are used, just as words and depictions (i.e., pictures, symbols, code, etc.) are used, to convey information to an onlooker. Colors and depictions are particularly well suited for trans-language conveyance of information. For example, many traffic signs have shapes, colors and depictions which immediately convey to a driver the desired traffic information without necessity of the driver reading words. A well known example is the ubiquitous stop sign, which is immediately recognizable because it is always red and always octagonal, and this is so irrespective of the word "STOP" being written thereupon in the language of the subject country (which language may or may not be readable by the driver). In this vein, automobile manufacturers have adopted depictions on the dashboard to convey to drivers information, such as international standard depictions for switches, gauges, etc. which represent lights, oil, temperature, wipers, etc.

With regard to the utilization of colors and/or depictions as a substitute for the information conveyed to an onlooker by words, is the necessity for the onlooker to intuitively associate the color and/or depiction with the information desired to be conveyed. One longstanding and well recognized association with respect to color is an onlooker's immediate intuitive thermal association of blue with cold and red with hot. To this end, automobile manufacturers have designed dashboard heating, air conditioning and ventilation (HVAC) system temperature controls with a graphic color scheme of blue and red, wherein blue is located at the colder end of the available settings and red is located at the hotter end of the available settings.

In the design of a graphic for a color coding scheme for HVAC systems, automobile manufacturers are constrained by a known problem in the printing arts in which one color cannot be faded into another color because the printing of a color onto another color that has already been printed on the same surface results in the inks commingling, creating a blotchy, extremely undesirable colorization which is not the desired color fade, but is of other colors, likely including brown and/or black. Therefore, automobile manufacturers have been forced to substitute for a true color fade from blue to red (and vice versa) an alternative color scheme that merely suggests mixing between the colors. In this regard, FIGS. 1 through 5 depict various conventional color schemes for HVAC systems in which the aforedescribed problem of inability to achieve true color fading is sidestepped.

Figures 1, 2:
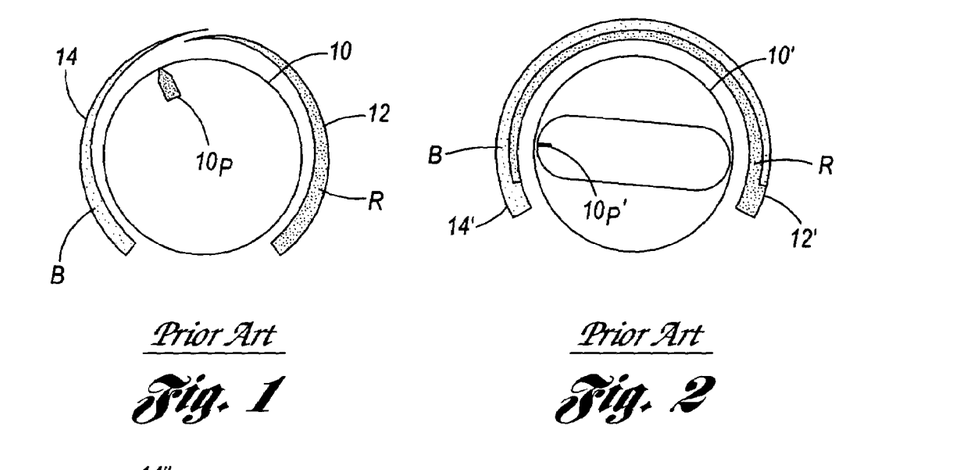
FIGS. 1 through 5 depict plan views of prior art color mixing simulations of two different colors, wherein color fading between the colors is not provided.

In FIG. 1, an HVAC system temperature control has a rotatable knob 10 having a position indicator 10p and the color graphic indicative of cold to hot (and vice versa) is represented by a tapered red colored R color graphic 12 and a tapered blue colored B color graphic 14, wherein a driver intuitively knows the temperature setting of the HVAC system by location of the position indicator with respect to the color graphic 12, 14 (colder in the more counterclockwise position, hotter in the more clockwise position).

In FIG. 2, an HVAC system temperature control has also a rotatable knob 10' having a position indicator 10p' and the color graphic indicative of cold to hot (and vice versa) is represented by a tapered red colored R color graphic 12' which adjacently coextends with respect to a tapered blue colored B color graphic 14', wherein, again, a driver intuitively knows the temperature setting of the HVAC system by location of the position indicator with respect to the color graphic 12', 14'.

Figure 3:
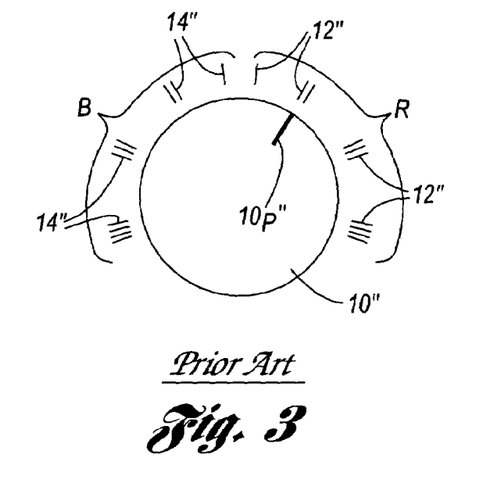

In FIG. 3, an HVAC system temperature control is again depicted as having a rotatable knob 10" with a position indicator 10p" and the color graphic indicative of cold to hot (and vice versa) is represented by a series of Roman numerals in the form of red colored R color graphic 12" and blue colored B color graphic 14", wherein, again, a driver intuitively knows the temperature setting of the HVAC system by location of the position indicator with respect to the color graphic 12", 14".

Figure 4:
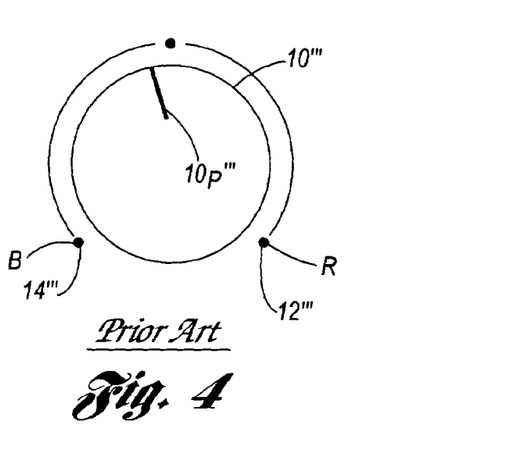

In FIG. 4, an HVAC system temperature control has, once again, a rotatable knob 10'" having a position indicator 10p'" and the color graphic indicative of cold to hot (and vice versa) is represented by a red colored R color graphic 12'" and a blue colored B color graphic 14'" each in the form of a dot at the respective end of travel of the knob, wherein a driver intuitively knows the temperature setting of the HVAC system by location of the position indicator with respect to the color graphic 12'", 14'".

Figure 5:
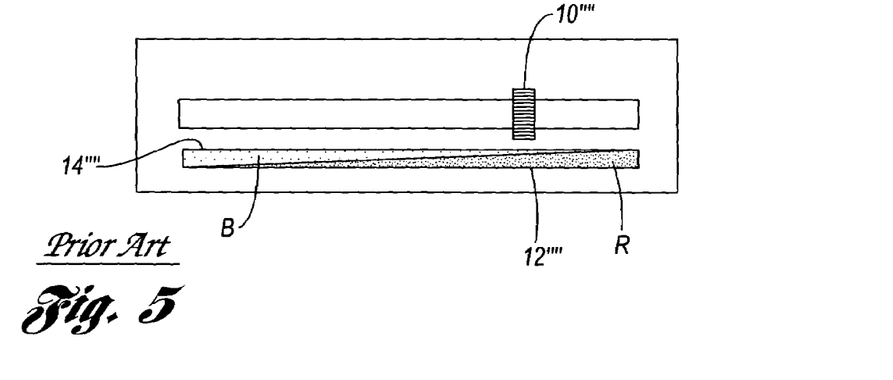

In FIG. 5, an HVAC system temperature control is a slidable knob 10"", which itself serves as a position indicator, and the color graphic indicative of cold to hot (and vice versa) is represented by a tapered red colored R color graphic 12"" and a tapered blue colored B color graphic 14"", wherein a driver intuitively knows the temperature setting of the HVAC system by location of the position indicator with respect to the relatively varying widths of the color graphic 12"", 14"".

It will thus be appreciated that because of the inability to achieve a color fade by directly printing one color upon another, color schemes are practiced in which colors are not actually printed over each other on the same surface in a fading manner, but rather a mixing is simulated by adjacently positioned colors.

Accordingly, what remains needed in the art is a true, continuous color fade transition between two different colors, particularly as this color fade transition intuitively conveys information (as for example hot to cold, and vice versa).

SUMMARY OF THE INVENTION

The present invention is a superposed colors graphic which provides a true, continuous color fade transition between two different colors.

According to a first, most preferred, embodiment of the superposed colors graphic according to the present invention, a single substrate is used, the substrate being composed of a transparent sheet material, as for example polycarbonate sheeting, having a first side surface and an opposite second side surface. A first color graphic of a first color is provided on the first side surface of the substrate, wherein the first color graphic is placed at a selected location of the substrate, has a selected shape, and has a first color fade of color intensity of the first color. A second color graphic of a second color different from the first color is provided, wherein the second color graphic is placed at a selected location of the second side surface of the substrate, has a selected shape, and has a second color fade of color intensity of the second color in predetermined correspondence with respect to the first color graphic. In this regard, it is preferred for the first color fade to be equal and opposite to the second color fade. The first and second color graphics are mutually registrated on the substrate at the time of application such that the first color fade is coextensively superposed with respect to the second color fade. With either back-lighting or direct lighting, an onlooker looking at the superposed colors graphic sees the first and second colors fading into each other, thereby blendingly transitioning continuously from one color to the other color at the mutually superposed (overlapping) first and second color fades.

According to a second, lesser preferred, embodiment of the superposed colors graphic according to the present invention, preferably identical first and second substrate sheets are used, each substrate being composed of a transparent sheet material, as for example polycarbonate sheeting, each having a first side surface and an opposite second side surface (herein the terms "first side surface" and "second side surface" are merely used to distinguish one side surface from the other side surface; that is, either side surface may be regarded as the first or second side surface, and there is no connotation implied with respect to possible printing arts terminology). A first color graphic of a first color is provided on the first side surface of the first substrate, wherein the first color graphic is placed at a selected location of the first substrate, has a selected shape, and has a first color fade of color intensity of the first color. A second color graphic of a second color different from the first color is provided, wherein the second color graphic is placed at a selected location of the first side surface of the second substrate, has a selected shape, and has a second color fade of color intensity of the second color in predetermined correspondence with respect to the first color graphic. In this regard, it is preferred for the first color fade to be equal and opposite to the second color fade. The first and second substrates are adjoined, preferably abuttingly, the first side surface of one of the first and second substrates facing the second side surface of the other of the first and second substrates such that the first and second color fades are mutually registrated in coextensively superposed relation. Now, with either back-lighting or direct lighting, an onlooker looking at the superposed colors graphic sees the first and second colors fading into each other, thereby blendingly transitioning continuously from one color to the other color at the mutually superposed (overlapping) first and second color fades.

In the course of practicing either the first or the second embodiments of the present invention, the first and second color graphics may be applied to the respective substrate side surfaces by any suitable method, such as for example by silk screening, by lithography or by decorative film applique.

Accordingly, it is an object of the present invention to provide a superposed colors graphic providing a true, continuous color fade transition between two different colors.

This and additional objects, features and advantages of the present invention will become clearer from the following specification of a preferred embodiment.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 14A and 14B are color versions of the first and second color graphics of FIGS. 6 and 7, respectively, wherein FIG. 14A is blue and FIG. 14B is red.

DESCRIPTION OF THE PREFERRED EMBODIMENT

Referring now to the Drawing, FIGS. 6 through 14B depict various views of the superposed colors graphic 100 which provides a continuous color fade transition between two different colors in accordance with the present invention. A convention is used in FIGS. 6 through 13C to depict colors and the respective intensity of color thereof, shown actually in FIGS. 14A and 14B, by the use of circles and crosses to depict the colors, respectively, and the respective color fade of color intensity based upon the relative spacing of the respective circles and crosses.

Figure 6:
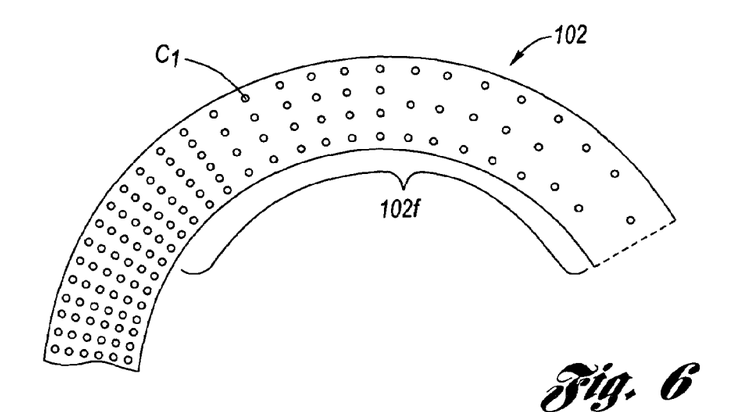
FIG. 6 is a top plan view of a first color graphic having a first color fade according to the present invention.
Figure 7:
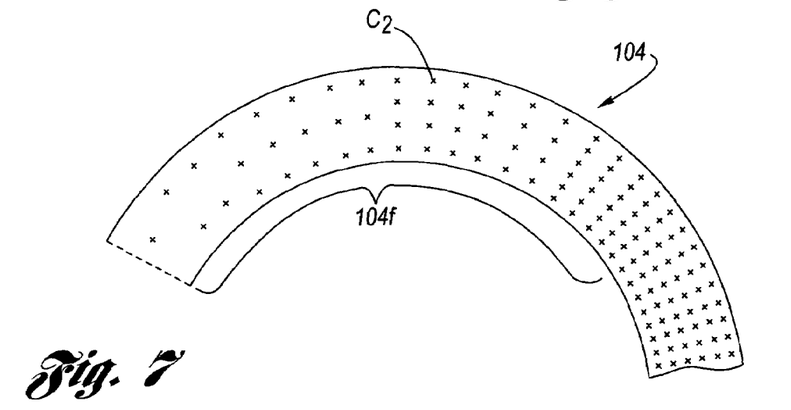
FIG. 7 is a top plan view of a second color graphic having a second color fade according to the present invention.
Figure 8:
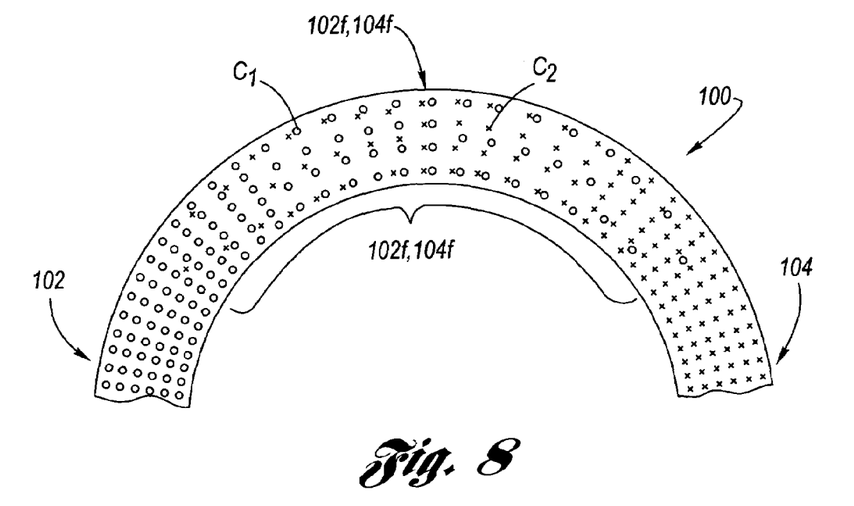
FIG. 8 is a top plan view of a superposed colors graphic according to the present invention formed by superposition of the first and second color fades of the first and second color graphic of FIGS. 6 and 7 which thereby provides a continuous color fade transition between the colors.

As shown by FIGS. 6 through 8, the superposed colors graphic 100 according to the present invention is composed of a first color graphic 102, shown at FIG. 6, having a first color fade 102f of color intensity of a first selected color $C_1$, a second color graphic 104, shown at FIG. 7, having a second color fade 104f of color intensity of a second selected color $C_2$, wherein superposition of the first and second color fades provides the superposed colors graphic 100 featuring a continuous color fade transition between the first and second selected colors, as shown at FIG. 8. It is to be noted that the shapes of the first and second color graphic 102, 104 may be any selected, mutually cooperating shapes to provide superposition (overlapping) of the first and second color fades 102f, 104f, an arch shape being shown merely by way of exemplification and not limitation.

Figures 9A, 9B, 9C, 10A:
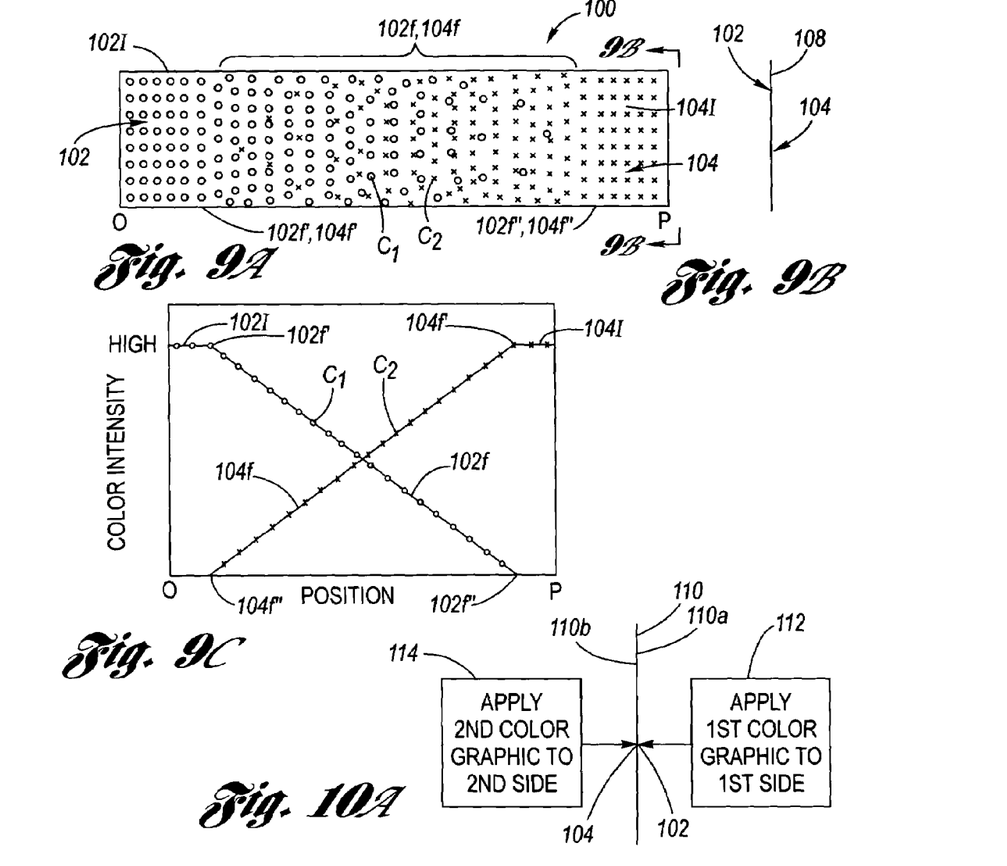
FIG. 9A is a top plan view of another example of a superposed colors graphic providing continuous color fade between colors in accordance with the present invention.
FIG. 9B is an end view seen along line 9B—9B of FIG. 9A.
FIG. 9C is a graphical plot of color intensities for the superposed colors graphic of FIG. 9A.
FIG. 10A is a schematic representation of a methodology for carrying out the present invention according to the most preferred method.

Referring now to FIGS. 9A through 9C, further particulars of the preferred color intensity fade of the superposed colors graphic 100 will be detailed.

As shown at FIG. 9B, the first and second color graphics 102, 104 are located on differing side surfaces of at least one substrate 108. The first and second color fades 102f, 104f begin at respective origins 102f', 104f' thereof, whereat is a selected initial color intensity 102I, 104I of the first and second colors $C_1$, $C_2$, respectively, as for example, the initial color intensities 102I, 104I may be a rich, deep and pure. At the respective termini 102f''', 104f''' of the first and second color fades 102, 104, the color intensity of the first and second colors $C_1$, $C_2$ vanishingly disappears (goes to zero). In this regard, the origin 102f' of the first color fade 102f is located at the terminus 104f''' of the second color fade 104f, and the origin 104f' of the second color fade is located at the terminus 102f''' of the first color fade.

FIG. 9C, plots the aforesaid color intensity changes for each of the colors $C_1$, $C_2$ versus position (distance) parallel to respective origins and termini of the superposed colors graphic 100 of FIG. 9A. As shown by FIG. 9C, it is preferred for the color intensities of the colors $C_1$, $C_2$ to equally and oppositely fade with respect to position (distance), wherein the fading of color intensity is linearly continuous from maximum to minimum from respective origin 102f', 104f' to respective terminus 102f''', 104f'''.

Referring now to FIGS. 10A through 11C two preferred methodologies are illustrated for providing the superposed colors graphic 100 featuring a continuous color fade transition between two different colors.

Figure 10B:
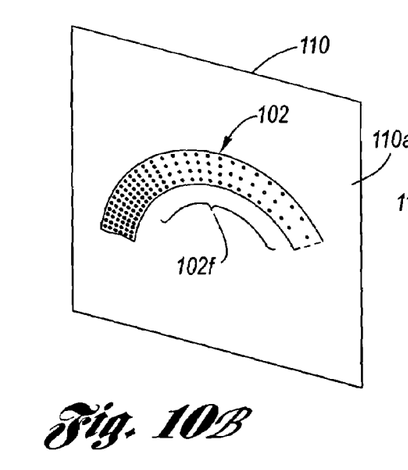
FIG. 10B is a perspective view of a first side surface of a substrate on which is provided, in accordance with the present invention, the first color graphic having the first color fade of FIG. 6.
Figure 10C:
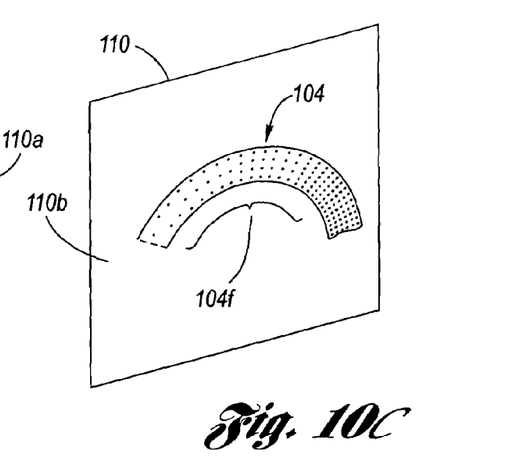
FIG. 10C is a perspective view of a second side surface of the substrate on which is provided, in accordance with the present invention, the second color graphic having the second color fade of FIG. 7.

The first, most preferred methodology according to the present invention is depicted by FIGS. 10A through 10C. As schematically shown at FIG. 10A, a single substrate 110 in the form of a transparent sheet material (preferably, but not necessarily, a flaccid, paper-thin sheet), as for example polycarbonate sheeting, has a first side surface 110a and an opposite second side surface 110b. The first color graphic 102 is applied 112 to the first side surface 110a, the completed application being shown at FIG. 10B. The second color graphic 104 is applied 114 to the second side surface 110b, the completed application being shown at FIG. 10C. The first and second color graphics 102, 104 are respectively applied 112, 114 to the respective substrate surfaces 110a, 110b by any suitable method, such as for example by silk screening, by lithography or by decorative film applique. The applications of the first and second color graphics 102, 104 visually cooperate with each other to provide the superposed colors graphic 100 according to the present invention in which the color fades 102f, 104f are in mutually coextensive superposition, as shown at FIG. 8.

With either back-lighting (see FIGS. 12A and 12B) or direct lighting (see FIGS. 13A and 13B), an onlooker looking at the superposed colors graphic 100 sees the first and second colors continuously fading into each other, thereby blendingly transitioning continuously from one color $C_1$ into the other color $C_2$, and vice versa, at the mutually superposed (overlapping) first and second color fades 102f, 104f.

Figure 11A:
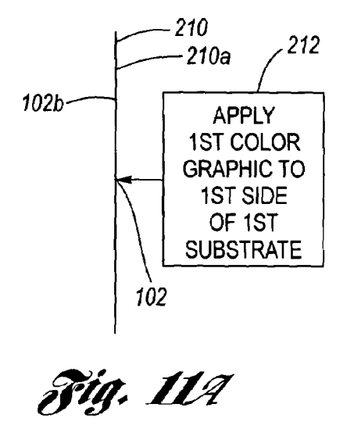
FIGS. 11A through 11F are schematic representations of a methodology for carrying out the present invention according to an alternative method.
Figures 11B, 11C:
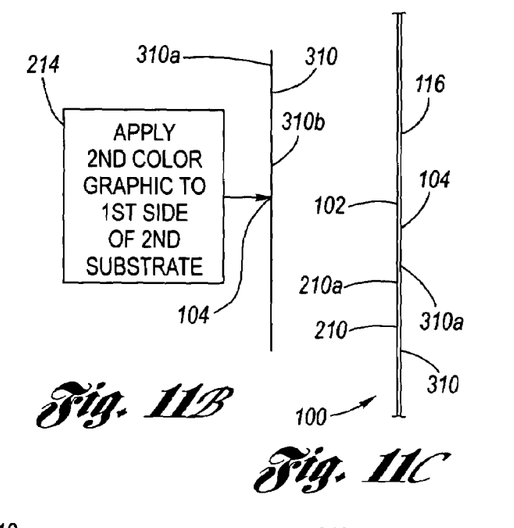

The second methodology according to the present invention is depicted by FIGS. 11A through 11E. As schematically shown at FIG. 11A, a first substrate 210 in the form of a transparent sheet material (preferably, but not necessarily, a flaccid, paper-thin sheet), as for example polycarbonate sheeting, has a first side surface 210a and an opposite second side surface 210b. The first color graphic 102 is applied 212 to the first side surface 210a, wherein the completed application is for example shown at FIG. 10B. As schematically shown at FIG. 11B, a second substrate 310 in the form of a transparent sheet material (also preferably, but not necessarily, a flaccid, paper-thin sheet, and preferably, but not necessarily identical to the first substrate 210), again as for example polycarbonate sheeting, has a first side surface 310a and an opposite second side surface 310b. The second color graphic 102 is applied 214 to the first side surface 310a, wherein the completed application is for example shown at FIG. 10C. The first and second color graphics 102, 104 are respectively applied 212, 214 to the respective substrate surfaces 210a, 310a by any suitable method, such as for example by silk screening, by lithography or by decorative film applique. Revisiting a comment made hereinabove, the terms "first side surface" and "second side surface" are merely used to distinguish one surface from the other, that is, either side surface may be regarded as the first or second side surfaces.

Figure 11D:
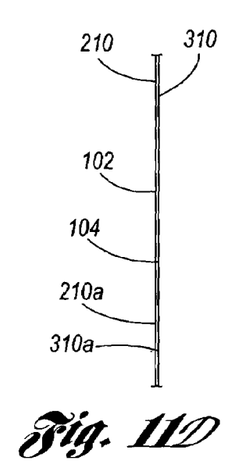
Figure 11E:
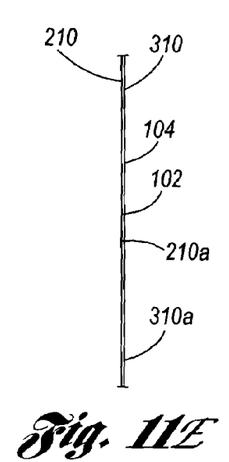
Figure 11F:
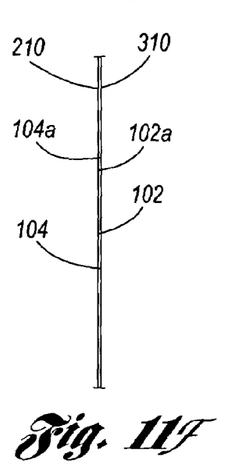

The first and second substrates 210, 310 are next mutually adjoined, preferably in touching abutment, to provide the superposed colors graphic according to the present invention, wherein the first side surface of one of the first and second substrates faces the second side surface of the other of the first and second substrates such that the first and second color fades 102f, 104f are in mutually coextensive superposition. For example, FIG. 11C depicts the first and second substrates 210, 310 adjoined, wherein the first side surface 210a of the first substrate faces away from the second substrate, and the first side surface 310a of the second substrate faces away from the first substrate. For a second example, FIG. 11D depicts the first and second substrates 210, 310 adjoined, wherein the first side surface 210a of the first substrate faces away from the second substrate, and the first side surface 310a of the second substrate faces toward the first substrate. For a third example, FIG. 11E depicts the first and second substrates 210, 310 adjoined, wherein the first side surface 210a of the first substrate faces toward the second substrate, and the first side surface 310a of the second substrate faces away from the first substrate. Finally, for a fourth example, FIG. 11F depicts the first and second substrates 210, 310 adjoined, wherein the first side surface 210a of the first substrate faces toward the second substrate, and the first side surface 310a of the second substrate faces toward the first substrate. An attachment 116 of the first and second substrates 210, 310 may be used, as for example an adhesive applied to the mutually facing side surfaces of the first and second substrates, to retain their mutual adjoinder and coextensively superposed registration.

With either back-lighting (see FIGS. 12A and 12B) or direct lighting (see FIGS. 13A and 13B), an onlooker looking at the superposed colors graphic sees the first and second colors continuously fading into each other, thereby blendingly transitioning continuously from one color $C_1$ into the other color $C_2$, and vice versa, at the mutually overlapping first and second color fades 120f, 104f.

As an alternative of the second methodology recounted hereinabove, the first substrate 210 remains transparent, but the second substrate 310 is not transparent. In a first example, the second substrate has, itself, diffusely reflective properties (as for example being a white sheet), thereby obviating a light reflective surface adjacent thereto for direct lighting of the first and second graphics 102, 104. In a second example, the second substrate has, itself, light diffusing properties for providing uniform brightness backlighting. In this alternative, at least the views of FIGS. 11D and 11F would be operative.

FIGS. 12A through 13B depict examples of an automotive application for the superposed colors graphic 100 which provides a continuous color fade transition between two different colors.

Figure 12A:
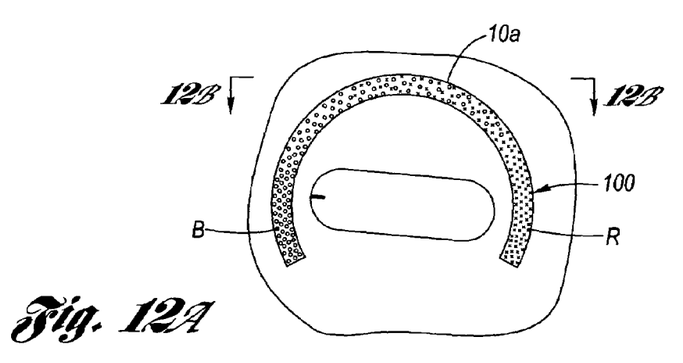
FIG. 12A is a plan view of the superposed colors graphic of FIG. 8, shown in a first exemplar environment of use.
Figure 12B:
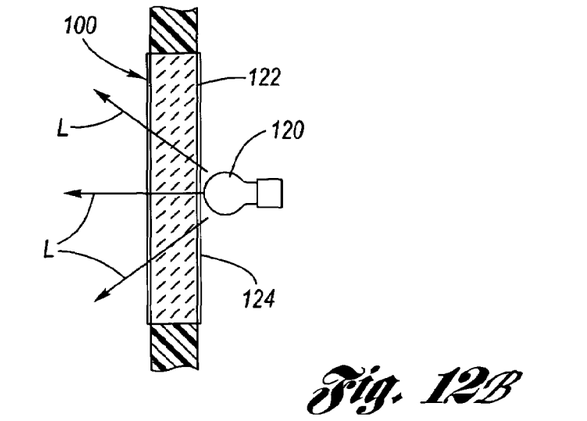
FIG. 12B is a sectional view taken along line 12B—12B of FIG. 12A, showing a back-lighting modality of operation of the present invention.

FIG. 12A is reminiscent of FIG. 2; however, now the superposed colors graphic 100 (the colors being blue B and red R) renders the operational settings of the knob 10a more immediately intuitive with respect to hot and cold settings of an HVAC system. While direct lighting is adequate for this visualization of color fading, FIG. 12B shows a back-lighting modality in which light L emitted a light source 120, passes through a light diffuser 124 (as for example translucent white ink or film) applied to a transparent support member 122 (for example, clear plastic or glass), and then passes out through the superposed colors graphic 100.

Figure 13A:
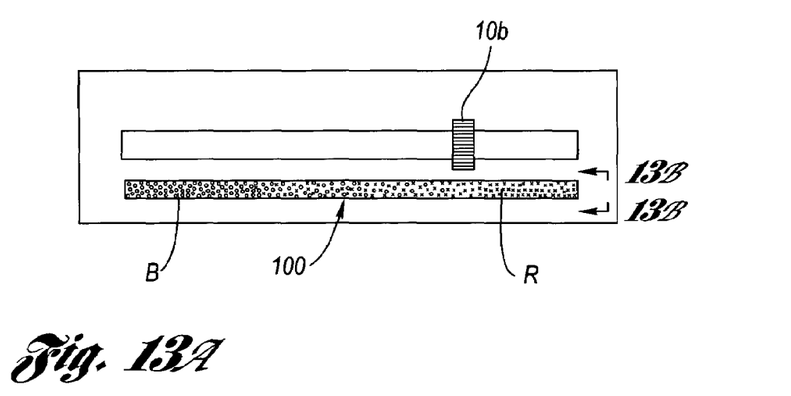
FIG. 13A is a plan view of the superposed colors graphic of FIG. 9A, shown in a second exemplar environment of use.
Figure 13B:
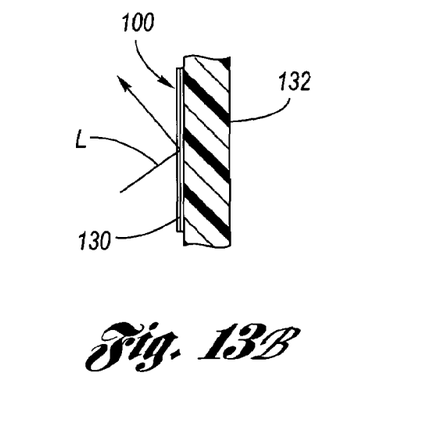
FIG. 13B is a sectional view taken along line 13B—13B of FIG. 13A, showing a direct lighting modality of operation of the present invention.

FIG. 13A is reminiscent of FIG. 5; however, now the superposed colors graphic 100 (the colors being blue B and red R) renders, like FIG. 12A, the operational settings of the knob 10b more immediately intuitive with respect to hot and cold settings of an HVAC system. While the back-lighting of FIG. 12b may be used for this visualization of color fading, FIG. 13B shows a direct lighting modality in which light L passes through the superposed colors graphic 100, bounces at a light reflective surface 130 (preferably a diffusely reflective surface, as for example a smooth white surface), and again passes out through the superposed colors graphic 100. The light reflective surface 130 and the superposed colors graphic 100 are mounted on a support surface 132.

Figure 14A:
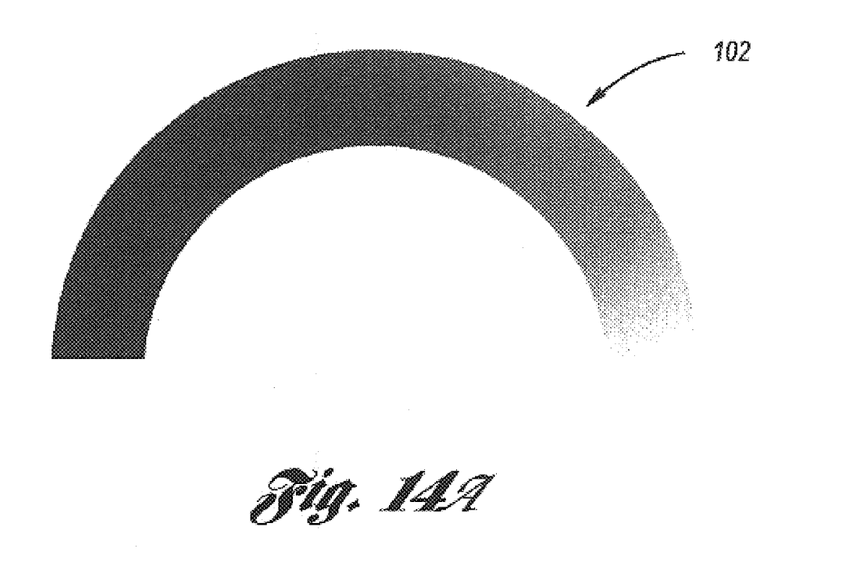
Figure 14B:
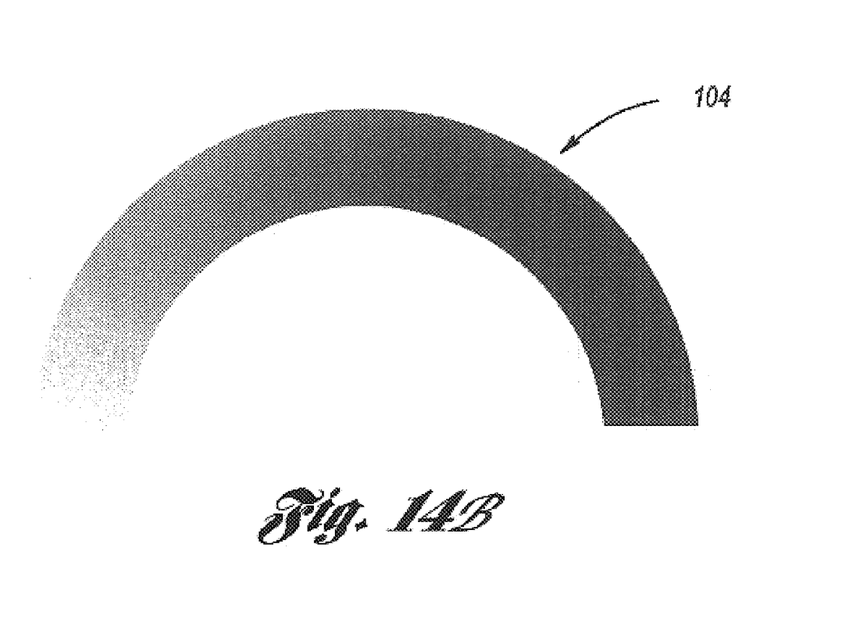

FIGS. 14A and 14B are actual color renditions of the aforedescribed first and second color graphics 102, 102 of FIGS. 6 and 7, wherein it will be seen that FIG. 14A is blue and 14B is red.

To those skilled in the art to which this invention appertains, the above described preferred embodiment may be subject to change or modification. For example, the shapes and colors of the first and second color graphics may be any chosen to provide a superposed colors graphic featuring a continuous color fade between the colors for any desired application. Such change or modification can be carried out without departing from the scope of the invention, which is intended to be limited only by the scope of the appended claims.

The invention claimed is:

1. A superposed colors graphic providing a continuous color fade transition between two different colors, comprising:
    a transparent substrate having a first side surface and an opposite second side surface;
    a first color graphic applied to said first side surface, said first color graphic having a first color fade of color intensity of a first color extending between a first origin and a first terminus; and
    a second color graphic applied to said second side surface, said second color graphic having a second color fade of color intensity of a second color different from said first color extending between a second origin and a second terminus;
    wherein said first and second color fades are mutually superposed such that direction of said first color fade from said first origin to said first terminus is opposite to direction of said second color fade from said second origin to said second terminus so as to thereby provide a continuous fade between said first and second colors.

2. The superposed colors graphic of claim 1, wherein said first and second color graphics have preselected shapes and relative positions so that said first color fade is coextensive with said second color fade.

3. The superposed colors graphic of claim 2, wherein said first color fade has a positional rate of change between said first origin and said first terminus that is equal to a positional rate of change of said second color fade between said second origin and said second terminus.

4. The superposed colors graphic of claim 3, further comprising a light reflective surface adjacent said substrate which provides direct light viewing of said first and second color graphics.

5. The superposed colors graphic of claim 4, wherein said substrate comprises a thin sheet of transparent material.

6. The superposed colors graphic of claim 3, further comprising a light source adjacent said substrate which provides back-light viewing of said first and second color graphic.

7. The superposed colors graphic of claim 6, wherein said substrate comprises a thin sheet of transparent material.

8. A superposed colors graphic for providing a continuous color fade transition between two different colors, comprising:
    a transparent first substrate having a first substrate first side surface and an opposite first substrate second side surface;
    a first color graphic applied to said first substrate first side surface, said first color graphic having a first color fade of color intensity of a first color extending between a first origin and a first terminus;
    a second substrate having a second substrate first side surface and an opposite second substrate second side surface; and
    a second color graphic applied to said second substrate first side surface, said second color graphic having a second color fade of color intensity of a second color different from said first color extending between a second origin and a second terminus;
    wherein said first and second substrates are mutually adjacent such that said first and second color fades are mutually superposed, wherein the superposition is such that direction of said first color fade from said first origin to said first terminus is opposite to direction of said second color fade from said second origin to said second terminus so as to thereby provide a continuous fade between said first and second colors.

9. The superposed colors graphic of claim 8, wherein said first and second color graphics have preselected shapes and relative positions so that said first color fade is coextensive with said second color fade.

10. The superposed colors graphic of claim 9, wherein each of said first and second substrates is transparent.

11. The superposed colors graphic of claim 9, wherein said first color fade has a positional rate of change between said first origin and said first terminus that is equal to a positional rate of change of said second color fade between said second origin and said second terminus.

12. The superposed colors graphic of claim 11, wherein each of said first and second substrates is transparent.

13. The superposed colors graphic of claim 12, further comprising a light reflective surface adjacent a selected side surface of one of said first and second substrates which provides direct light viewing of said first and second color graphics.

14. The superposed colors graphic of claim 13, wherein the mutual adjoinder of said first and second substrates is retained by an attachment.

15. The superposed colors graphic of claim 12, further comprising a light source adjacent a selected side surface of one of said first and second substrates which provides back-light viewing of said first and second color graphics.

16. The superposed colors graphic of claim 15, wherein the mutual adjoinder of said first and second substrates is retained by an attachment.

17. A method for providing a superposed colors graphic featuring a continuous color fade transition between two different colors, comprising the steps of:
 applying a first color graphic to a side surface of at least one selected transparent substrate, wherein the first color graphic has a first color fade of color intensity of a first color extending between a first origin and a first terminus;
 applying a second color graphic to another side surface of the at least one selected transparent substrate, wherein the second color graphic has a second color fade of color intensity of a second color extending between a second origin and a second terminus;
 wherein said steps of applying mutually superposes said first and second color fades such that direction of said first color fade from said first origin to said first terminus is opposite to direction of said second color fade from said second origin to said second terminus so as to thereby provide a continuous fade between said first and second colors.

18. The method of claim 17, wherein said steps of applying provide said first and second color graphic with preselected shapes and relative positions so that said first color fade is coextensive with said second color fade.

19. The method of claim 18, wherein said steps of applying provide said first color fade with a positional rate of change between said first origin and said first terminus that is equal to a positional rate of change of said second color fade between said second origin and said second terminus.

20. The method of claim 19, wherein the at least one selected transparent substrate comprises a transparent first substrate and a second substrate, said method further comprising:
 said first step of applying comprising the first graphic being applied to a side surface of the first substrate;
 said the second step of applying comprising the second graphic being applied to a side surface of the second substrate; and
 adjoining said first and second substrates to thereby provide the coextensive superposition of said first color graphic with respect to said second color graphic.

* * * * *